(12) United States Patent
Mills

(10) Patent No.: US 6,955,387 B2  
(45) Date of Patent: Oct. 18, 2005

(54) FLOOR PANEL

(75) Inventor: Michael John Mills, Rugby (GB)

(73) Assignee: Intier Automotive Interiors, Ltd., Maidstone (GB)

(*) Notice: Subject to any disclaimer, the term of this patent is extended or adjusted under 35 U.S.C. 154(b) by 0 days.

(21) Appl. No.: 10/296,275

(22) PCT Filed: May 23, 2001

(86) PCT No.: PCT/IB01/01209
§ 371 (c)(1),
(2), (4) Date: Jun. 2, 2003

(87) PCT Pub. No.: WO01/89878
PCT Pub. Date: Nov. 29, 2001

(65) Prior Publication Data
US 2004/0021331 A1 Feb. 5, 2004

(30) Foreign Application Priority Data
May 23, 2000 (GB) .............................. 0012311

(51) Int. Cl.[7] ............................ B80R 13/01; B80P 1/52; B65G 7/04
(52) U.S. Cl. ..................... 296/97.23; 296/39.1; 414/530
(58) Field of Search .......................... 296/39.1, 97.23, 296/39.2, 26.09, 16, 18, 193.07, 191; 414/529, 530

(56) References Cited

U.S. PATENT DOCUMENTS

| | | | | |
|---|---|---|---|---|
| 2,143,285 A | * | 1/1939 | Schofield | 296/41 |
| 2,347,002 A | * | 4/1944 | Schofield | 296/16 |
| 2,454,566 A | * | 11/1948 | Pfeiffer | 414/522 |
| 3,389,815 A | * | 6/1968 | Houser | 414/536 |
| 4,805,852 A | * | 2/1989 | Nordstrom | 244/137.1 |
| 4,944,612 A | * | 7/1990 | Abstetar et al. | 296/39.2 |
| 5,205,602 A | * | 4/1993 | Hoare et al. | 296/39.1 |
| 5,253,918 A | | 10/1993 | Wood et al. | 296/39.2 |
| 5,322,335 A | * | 6/1994 | Niemi | 296/97.23 |
| 5,605,108 A | * | 2/1997 | Woosley | 112/475.23 |
| 5,722,711 A | | 3/1998 | German | 296/39.2 |
| 5,725,926 A | * | 3/1998 | Wang | 428/78 |
| 5,806,909 A | * | 9/1998 | Wise | 296/39.1 |
| 5,975,607 A | * | 11/1999 | Stewart | 296/17 |
| 6,017,074 A | * | 1/2000 | Biskup | 296/39.1 |
| 6,027,781 A | * | 2/2000 | Landry et al. | 428/40.1 |
| 6,129,402 A | * | 10/2000 | Carriere | 296/39.1 |
| 6,261,667 B1 | * | 7/2001 | Yang | 428/172 |
| 6,406,085 B1 | * | 6/2002 | Stanesic | 296/97.23 |
| 6,530,730 B2 | * | 3/2003 | Swensen | 410/106 |
| 6,534,146 B1 | * | 3/2003 | Mentz, Jr. | 428/95 |
| 6,677,027 B1 | * | 1/2004 | Lu | 428/138 |
| 6,695,380 B1 | * | 2/2004 | Hicks | 296/97.23 |

* cited by examiner

Primary Examiner—Patricia L. Engle
(74) Attorney, Agent, or Firm—Honigman Miller Schwartz and Cohn LLP

(57) ABSTRACT

A floor panel for a vehicle compartment includes a first surface and a second surface opposite the first surface. The first surface and the second surface have different material properties. One of the surfaces is provided with a plurality of rollers disposed to project above the surface when the surface is uppermost. Both of the first and said second surfaces are capable of being uppermost while the floor panel is located in the vehicle compartment.

15 Claims, 6 Drawing Sheets

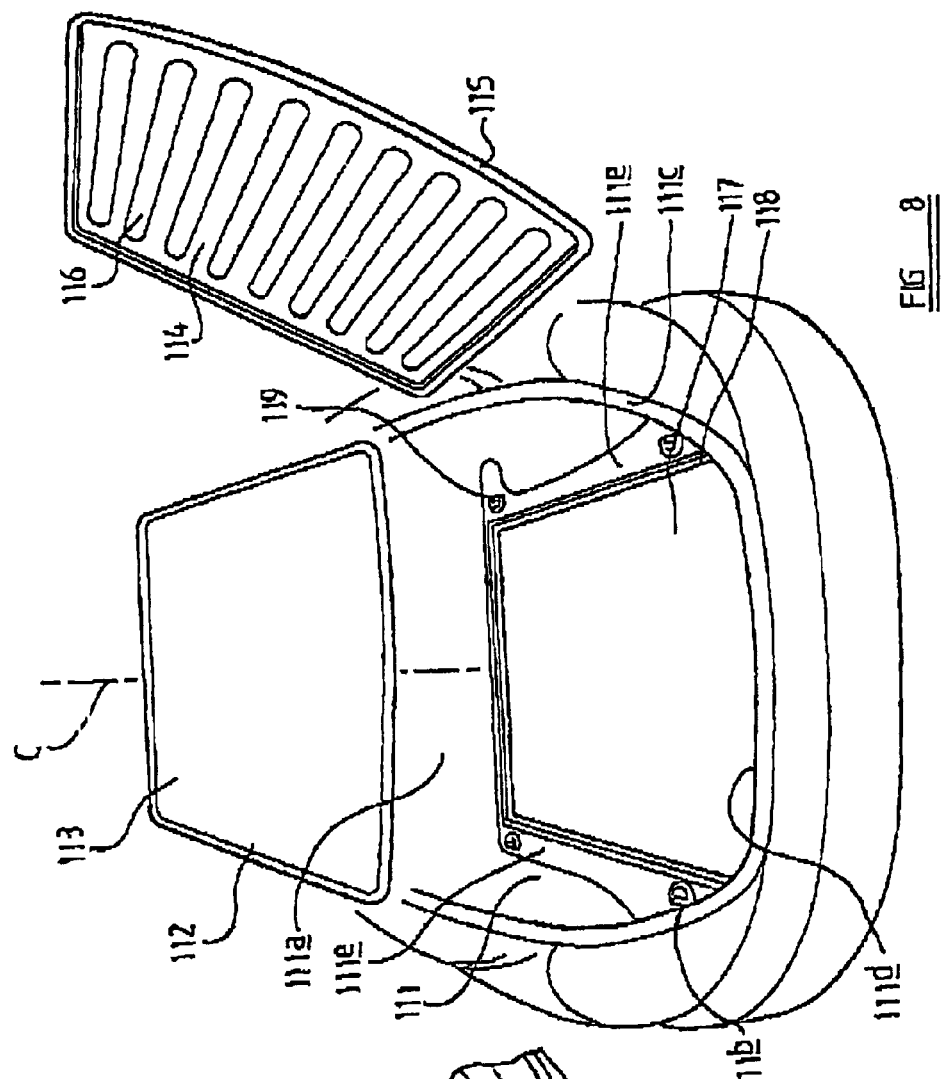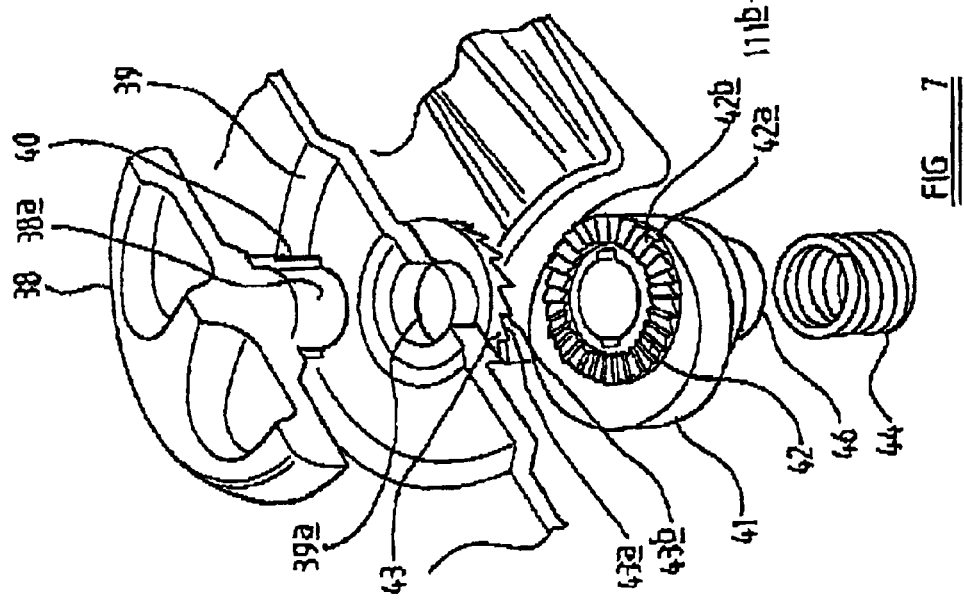

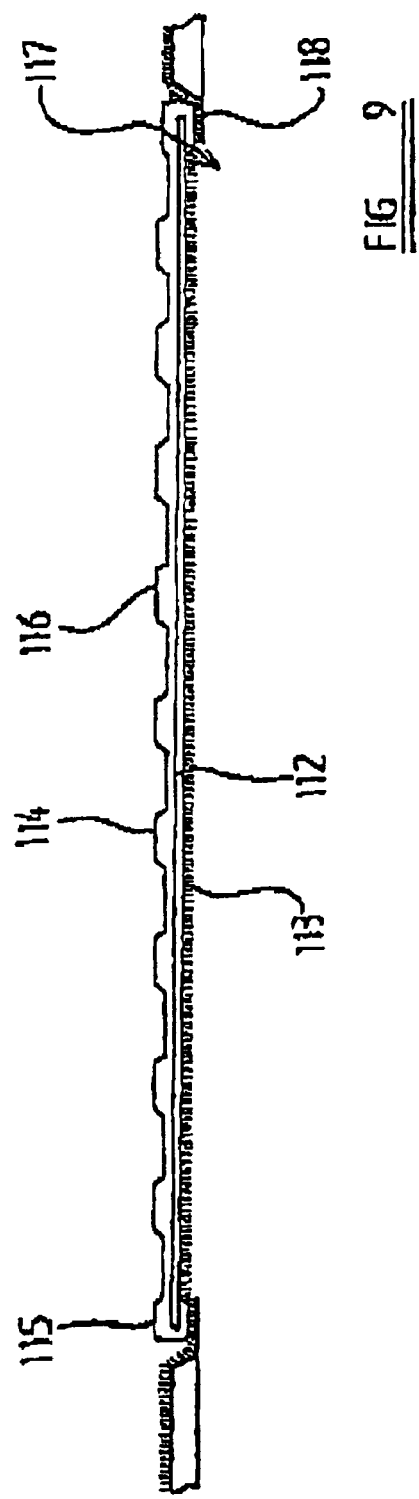
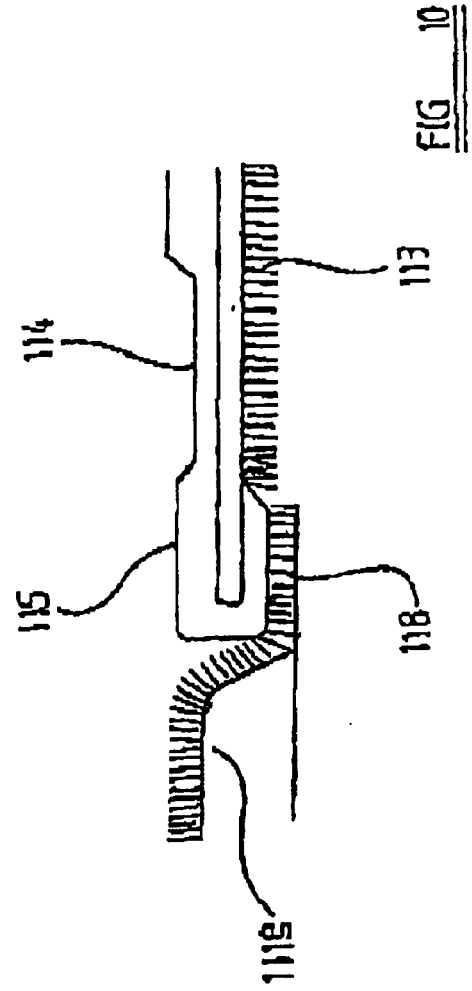

FLOOR PANEL

BACKGROUND OF THE INVENTION

1. Field of the Invention

This invention relates to floor panels for vehicle compartments.

2. Description of the Related Art

In many vehicles, particularly automobiles, it is known to provide vehicle compartments with a suitable trim, for example carpet, to reduce noise, for aesthetic reasons and for comfort of occupants of the compartment if appropriate. However, with use such trim can become soiled or damaged, particularly in load carrying compartments, for example car boots. U.S. Pat. No. 4,944,612 discloses a lining for a load bed of an open-bodied truck, but such a lining is simply intended to cover the exposed metal surfaces of the load bed. German Gebrauchsmuster number DE 29909851 U discloses adapting a vehicle compartment to carry bicycles, but is not generally applicable to other loads.

SUMMARY OF THE INVENTION

An aim of the present invention is to provide a new or improved floor panel.

According to one aspect of the invention we provide a floor panel for a vehicle compartment, the panel comprising a first surface and a second surface, wherein the panel is adapted to be disposed in the vehicle compartment with a selected one of said surfaces uppermost.

One of said surfaces may comprise carpet.

One of said surfaces may comprise a durable surface, preferably comprising a durable polymer.

One of said surfaces may be provided with a plurality of bearing means disposed to project above said surface when said surface is uppermost.

According to a second aspect of the invention we provide a floor panel for a vehicle compartment, wherein the panel comprises a surface and a plurality of bearing means disposed to project above said surface.

The bearing means may comprise a plurality of rollers.

Each of said plurality of rollers may have an axis of rotation, each axis of rotation being generally parallel and wherein said axes of rotation may be disposed such that a load is introduced into the compartment in a direction generally transverse to said axes.

Releasable locking means may be provided to prevent or restrain rotation of said bearing means.

The locking means comprises a locking surface which is moveable into engagement with a surface of the bearing means.

The panel may be adapted to extend across the whole width of the vehicle compartment.

The panel may extend across a part of the vehicle compartment.

The panel may be adapted to engage support means provided in the vehicle compartment.

The panel may be symmetrical.

The panel may comprise anchor means to engage load restraint means.

The anchor means may comprise D-rings.

A surface of the panel may comprise ridges.

Where the panel comprises bearing means, the bearing means may be provided such that they project above the upper sin-face of said ridges.

According to a third aspect of the invention we provide a vehicle comprising a vehicle compartment wherein there is provided a panel according to the first or second aspects of the invention.

BRIEF DESCRIPTION OF THE DRAWINGS

The invention will now be described by way of example only with reference to the accompanying drawings wherein;

FIG. 7 is an exploded partially cut-away view on a larger scale of part of FIG. 6.

FIG. 8 is a perspective view illustrating a first and second surface of a panel for an alternate compartment of the vehicle according to an embodiment of the present invention.

FIG. 9 is a section through the panel of FIG. 8 disposed in the vehicle compartment, and FIG. 10 is a view in more detail of part of FIG. 9.

DESCRIPTION OF THE PREFERRED EMBODIMENT

Figure 1:
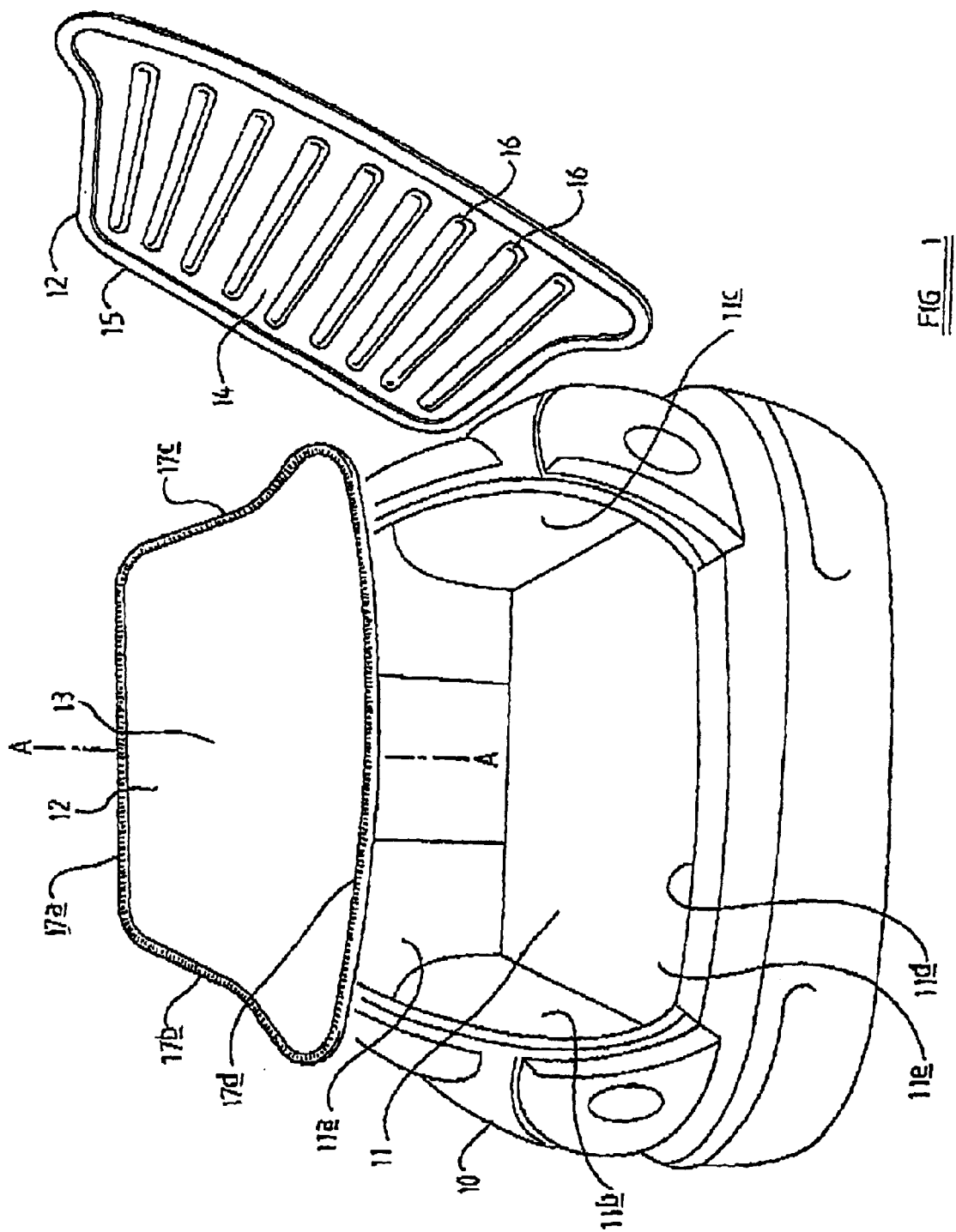
FIG. 1 is a perspective view illustrating a first and second surface of a panel for a compartment of a vehicle according to an embodiment of the present invention.

Referring now to FIG. 1, a rear part of a vehicle is shown at 10 comprising a vehicle compartment 11 having a forward wall 11a, side walls 11b, 11c, a rear wall 11d and a floor part 11e. A floor panel according to a first embodiment of a first aspect of the present invention is shown at 12. The panel comprises a first surface 13, in the present example comprising a yielding surface such as carpet, and a second surface 14 uppermost, comprising a durable, preferably liquid-resistant surface comprising for example a suitable durable polymer based material bonded or laminated to the underside of the first surface 13. By "durable" we preferably mean a scratch-resistant and liquid resistant material, also preferably a washable and substantially rigid material. The surface 14 comprises a raised edge part 15 extending around the periphery of the panel 12 and a plurality of elongate ridge parts 16 disposed such that when the panel 12 is disposed in the vehicle compartment 11, the ridges 16 extend in a direction from the rear wall 11d towards the front wall 11a. The periphery of the panel 12 is shaped to have a forward part 17a, side parts 17b, 17c, and a rearward part 17d to engage the compartment walls 11a, 11b, 11c, 11d respectively to hold the panel 12 in place within the vehicle compartment 11. The panel is symmetrical about an axis generally shown at A such that the panel 12 may be located in the vehicle compartment 11 with either the first surface 13 or second surface 14 uppermost.

The panel 12 may thus be located in the vehicle compartment 11 to protect the compartment floor 11e, with a desired surface 13, 14 uppermost depending what it is desired to place in the vehicle compartment 11. Where it is desired to place a relatively light and/or clean load in the compartment 11, the surface 13 with carpet may be placed uppermost. If a heavy or dirty load is intended to be used, the panel may be removed from the compartment 11, rotated about axis A as shown in FIG. 1 such that surface 14 is uppermost and replaced in the compartment 11. The ridges 16 are oriented to assist loads being pushed or slid into the compartment 11, whilst the ridge 15 retains any spillage or detritus from the load.

Figure 2:
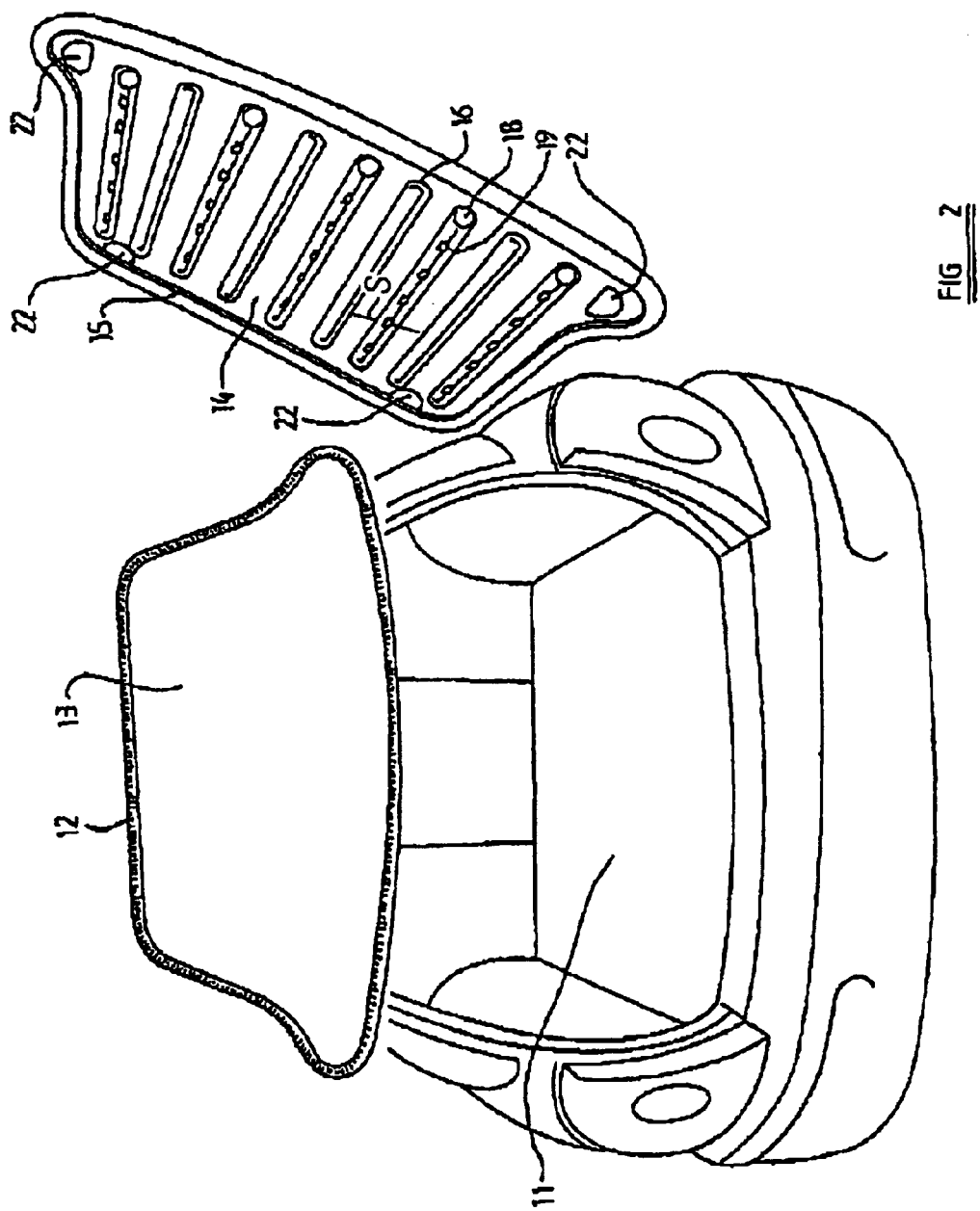
FIG. 2 is a perspective view illustrating a first and second surface of an alternate panel for the compartment of the vehicle according to an embodiment of the present invention.

Referring now to FIG. 2, a second embodiment of the panel 12 is shown. The same reference numerals are used in FIG. 2 as in FIG. 1 for the same parts. In the second embodiment, however, in addition to ridges 16, the second surface 14 is provided with additional ridge parts 18 having rotatable bearing means, in the present example comprising rollers 19. The rollers 19 are disposed such that they project above the tipper surface of the additional ridge parts 18 and are mounted for rotation about a horizontal axis S extending generally transverse to the ridges 18. A manually operable looking means 20 may be provided to stop rotation of the rollers 19 if desired.

Figure 3:
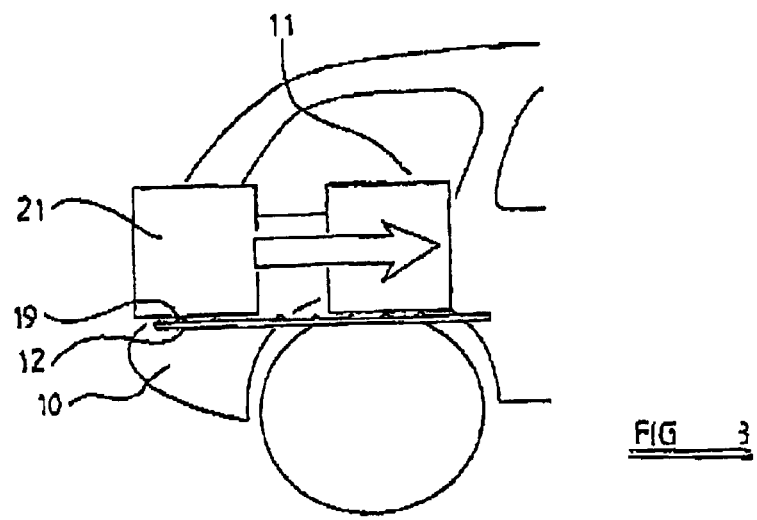
FIG. 3 is a side view of a vehicle compartment provided with the floor panel of FIG. 2.
Figure 4:
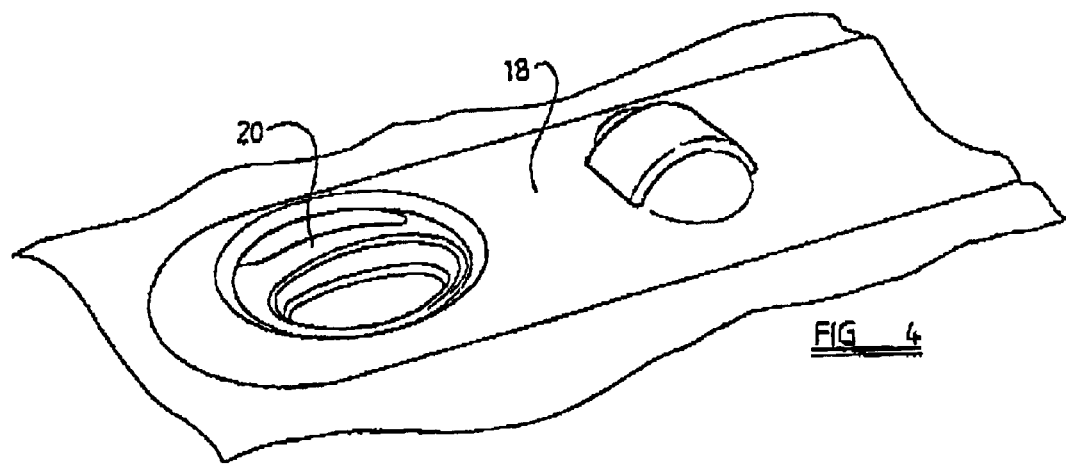
FIG. 4 is a perspective view on a larger scale of part of the panel of FIG. 2.

As seen in FIG. 3, when it is desired to place a load 21 in the vehicle compartment 11, the panel 12 is disposed in the compartment 11 such that the durable second surface 14 is uppermost. The locking means 20 is activated such that the rollers 19 are able to rotate and the load 21 placed in a rearward part of the compartment 11. The load 11 can then be pushed in a forward direction by virtue of engagement with the rollers 19 until the load is in a desired position. The manually operable braking control 20 may then be operated to lock the rollers 19 to prevent rotation. The surface 14 may be provided with anchor means, in the present example D-rings 22, which for example engage straps or restraining means to hold the load 21 in position.

Figure 6:
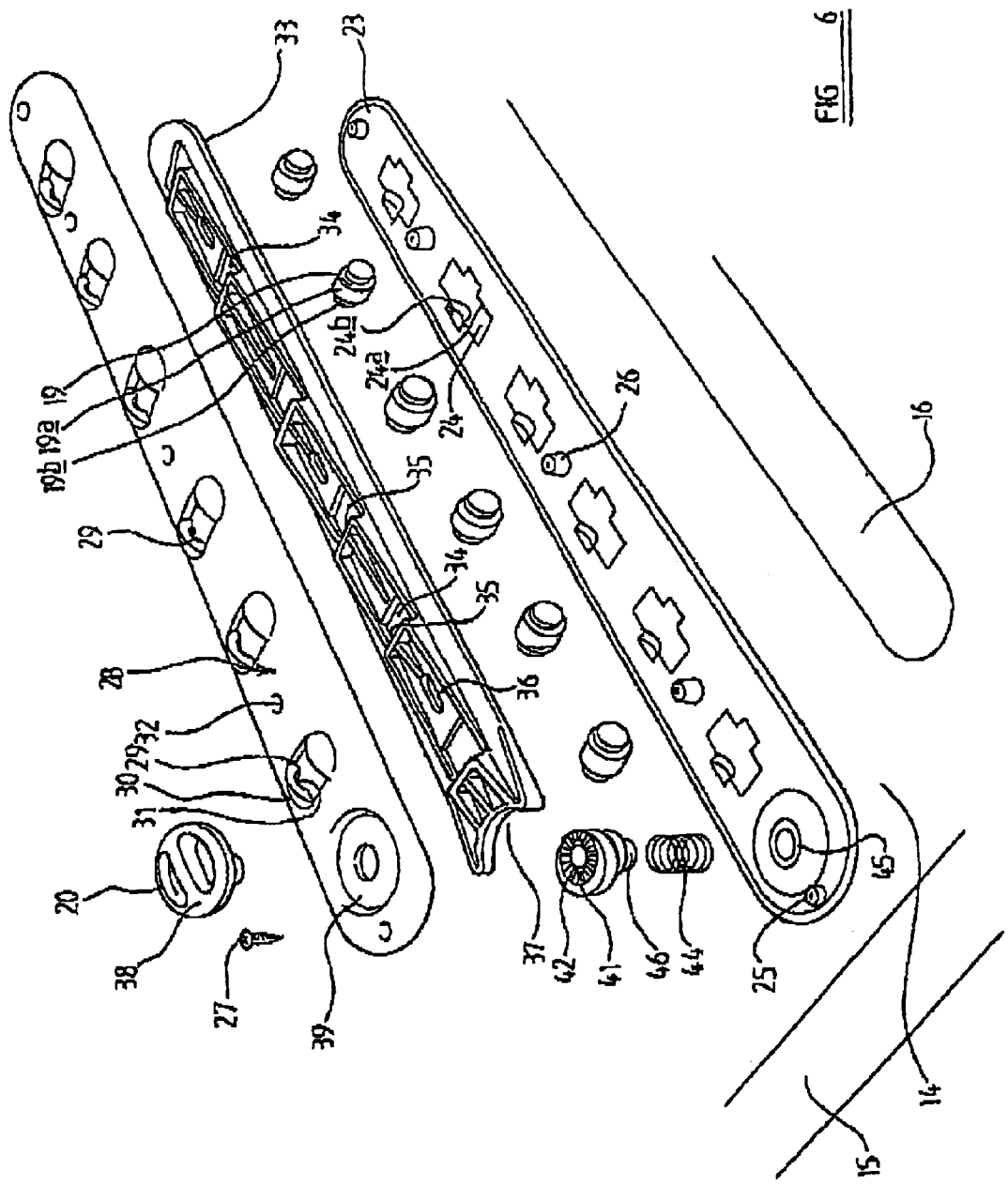
FIG. 6 is an exploded view of part of the panel of FIG. 2.

Referring now to FIGS. 6 and 7, the locking means 20 is shown in more detail. As best seen in FIG. 6, the surface 14 is provided with ridges 16 and with a recessed area 23 to receive a further ridge part 18. Each roller 19 comprises a central cylindrical portion 19a, at either end of which and co-axial therewith with are end cylindrical portions 19b. The recessed area 23 is provided with indents 24 each having an elongate central part 24a to receive the central cylindrical portion 19a of a corresponding one of the rollers 19, and side portions 24b adapted to receive the cylindrical end portions 19b such that the central cylindrical portion 19a is spaced from the floor of the central part 24a.

In the present example, six rollers 19 and corresponding indents 24 are provided in each further ridge part 18, although any number may be provided as desired. The recess 23 is further provided with end connection means 25 and central connection means 26 to receive fasteners 27. The further ridge part 18 is provided by a cover plate 28 provided with a plurality of apertures 29 each corresponding to an indent 24 and through which a corresponding roller 19 passes. Adjacent each aperture 29 is an upstanding ridge portion 30, defining a downwardly opening part cylindrical portion 31, such that when the cover plate 28 is located over the recess 23 each side portion 24b and corresponding part cylindrical portion 31 define a cylindrical recess to receive a cylindrical end portions 19b of a roller 19. The cover plate 28 is further provided with a plurality of fastening holes 32 such that each fastening hole 32 corresponds to an end connection means 25 or a central connection means 26 and through which a fastener 27 is passed.

Disposed between the recess 23 and the cover plate 28 is a braking element 33. The braking element 33 comprises a plurality of apertures 34 each corresponding to a roller 19. Adjacent each aperture 34 is a locking surface 35 adapted to engage a roller 19. A plurality of elongate slots 36 are provided which receive the upstanding connection means 26 such that the braking element 33 is able to move in the direction of the slots relative to the engagement means 26. At the end of the braking element 33 nearest a manual engagable handle 38 is a part circular recess 37. As seen in FIG. 7, the locking means 20 comprises a manually engagable handle 38, part received in a circular recess 39 in the cover plate 28. The handle 38 has a rod part 38a which passes through an aperture 39a in the cover plate 28 and is keyed by lugs 40 to a cam element 41. The cam element 41 is of generally circular cross-section, but is offset from the axis of rotation of the handle 38. A first circular ratchet gear 42 is provided on the upper surface of the cam element 41, and engages a corresponding second circular ratchet gear 43 disposed on the underside of cover plate 28 concentric with the aperture 39a. A resilient biasing means, in the present example a coil compression spring 44 engages a channel 45 of the recess 23 and a lower cylindrical part 46 of the cain element 41, and thus acts to urge the cam element in an upward direction such that the first ratchet gear 42 and second ratchet gear 43 are engaged.

When it is desired to lock the rollers 19 to prevent them from rotation, the handle 28 is turned in a clockwise direction as shown in FIGS. 6 and 7. The cam element 41 is turned in a clockwise direction and inclined surfaces 42a, 43b of the ratchet gear 42 and upper ratchet gear 43 respectively slide over one another against the resistance of the coil compression spring 44. The cam element 41 engages the part circular face 37 of the braking element 33, urging the braking element 33 to the right as seen in FIG. 6 such that the locking surfaces 35 each engage the corresponding roller 19. The friction between the rollers 19 and the locking surfaces 35 thus prevent rotation of the rollers 19. Upstanding edges 42b, 43b of the first ratchet gear 42 and second ratchet gear 43 respectively engage, thus preventing anticlockwise movement of the cam element 41.

When it is required to release the brake element 33, the handle 28 is depressed against the resistance of the coil compression spring 44 disengaging the first ratchet gear 42 and second ratchet gear 43 and permitting the cam element 41 to rotate anti-clockwise as seen in FIGS. 6 and 7 such that the brake element 33 is permitted to move to the left and disengage the brake surfaces 35 from the respective rollers 19.

Although the bearing means 19 are shown in the present example in a floor panel having a pair of surfaces either which may be selected to be uppermost, in a second aspect of the invention it will be apparent that such bearing means could be provided in a floor panel where only the surface provided with the rollers 19 is intended to be uppermost. Such a panel may be removable, or may be permanently or semi-permanently fixed in place in the vehicle compartment.

Figure 5:
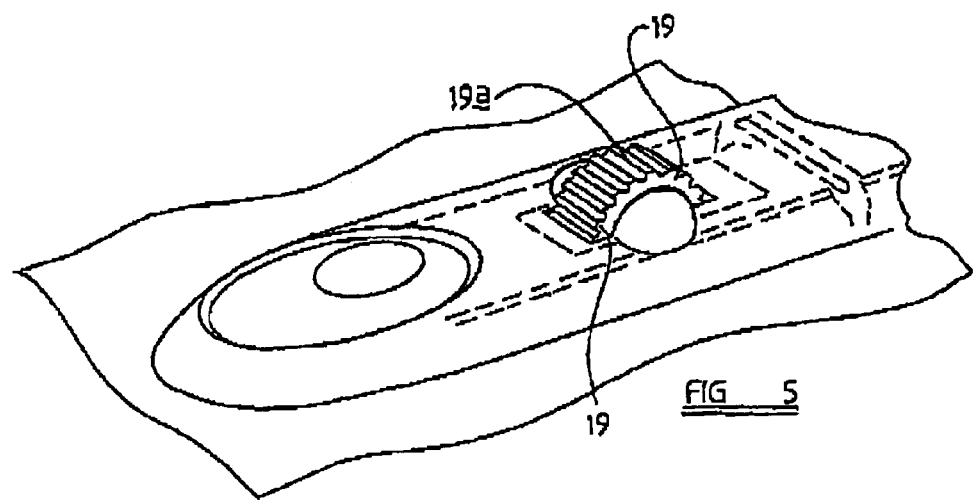
FIG. 5 is a similar view to FIG. 4 showing an alternative configuration of part of the panel of FIG. 2.

As seen in FIG. 5, the rollers 19 may be provided with a surface having toothed projections 19a to engage a load. The bearing means may alternatively comprises spherical or part-spherical elements mounted for rotation, or may be of any other desired shape as appropriate.

Referring now to FIGS. 8 to 10, a vehicle 110 is shown having a vehicle compartment 111 which is not symmetrical about the centre line of the vehicle, unlike the compartment 11 of FIGS. 1 to 3. The compartment 111 comprises side walls 111b, 111c, a rearward wall 111d and a floor 111e. It will be apparent that the side walls 111b, 111c are of different configuration and so it would not be possible to provide a reversible panel which engages the side walls 111b, 111c. According to a further embodiment of the first aspect of the invention, and as shown in FIG. 8, a panel 112 is provided wherein the width of the panel 112 is less than the width of the vehicle compartment 111, and wherein the panel 112 is symmetrical about axis C. As in the panels of FIGS. 1 and 2, the panel 112 is provided with a first surface 113 comprising a carpet or like material, and a durable surface 114 provided with a raised periphery 115 and a plurality of ridges 116.

Provided in the floor 111e of the compartment 111 is a support means 117 shaped to receive the floor panel 112. The support means 117 comprises a lip part 118 to receive an edge part 115 provided on the panel 112. The lip part 118 may be provided on an edge part of a deeper recess, for example a well for a spare wheel, or the support means 117 may be only sufficiently deep to receive the panel 112 such that whichever surface is uppermost is generally at the same height as the side parts of the compartment floor 111e. In the embodiment as shown in FIGS. 9 and 10, the panel 112 is preferably provided with edge parts 115 on both surfaces 113 and 114 of the panel 112. The edge parts 115 rest on the lip part 118 in load bearing relation thereto such that the carpet of surface 113 is not crushed or spoiled by transmitting load from the panel 112 to the lip part 118. In this configuration, load restraint means comprising D-rings 119 are provided on the floor 111e of the compartment 111. It will be apparent that the panel 112 may be provided with bearing means or any other feature described herein with reference to the first and second embodiments.

Although the floor panels 12, 112 described herein have been shown as being located in the boot of an automobile, it will be apparent that panels according to the present invention may be used, for example in the foot wells of a passenger compartment of a vehicle, or a loading carrying compartment of any other vehicle as desired.

Although as described, the panel 12, 112 has been stated to comprise a polymer based material to provide the durable side, bonded/laminated to the carpet side, the panel may of course have any suitable structure as desired to provide an appropriate strength panel. The durable surface and carpet may be bonded to a core panel or armature of suitable rigidity, for example a steel plate, or any other structure may be used as desired.

In the present specification "comprise" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

While the invention has been specifically described in connection with certain specific embodiments thereof, it is to be understood that this is by way of illustration and not of limitation, and the scope of the appended claims should be construed as broadly as the prior art will permit.

What is claimed is:

1. A floor panel for a vehicle compartment, the panel comprising a first surface and a second surface opposite said first surface, wherein one of said first and second surfaces is provided with a plurality of bearing elements disposed to project above said surface when said surface is uppermost, and wherein both of said first and said second surfaces are capable of being uppermost while said floor panel is positioned completely within the vehicle compartment.

2. A panel according to claim 1, wherein the bearing elements comprises a plurality of rollers.

3. A panel according to claim 2, wherein each of said plurality of rollers has an axis of rotation, each axis of rotation being generally parallel and wherein said axes of rotation are disposed such that a load is introduced into the compartment in a direction generally transverse to said axes.

4. A pane according to claim 1, wherein locking means is provided to releasably prevent rotation of said bearing means.

5. A panel according to claim 4, wherein the locking means comprises a locking surface which is moveable into engagement with a surface of the bearing means.

6. A panel according to claim 1, wherein the panel is adapted to extend across a width of the vehicle compartment.

7. A panel according to claim 1, wherein the panel extends across a part of the vehicle compartment.

8. A panel according to claim 1, wherein the panel is adapted to engage support means provided in the vehicle compartment.

9. A panel according to the panel is symmetrical.

10. A panel according to claim 1, further comprising anchor means to engage load restraint means.

11. A panel according to claim 10, wherein the anchor means comprises D-rings.

12. A panel according to claim 1, wherein one of said surfaces includes ridges.

13. A panel according to claim 1, wherein said first surface has a different material property than said second surface.

14. A panel according to claim 13, wherein one of said surfaces comprises carpet.

15. A panel according to claim 13, wherein one of said surfaces comprises a polymer material.

* * * * *

UNITED STATES PATENT AND TRADEMARK OFFICE
CERTIFICATE OF CORRECTION

PATENT NO. : 6,955,387 B2
DATED : October 18, 2005
INVENTOR(S) : John M. Mills

It is certified that error appears in the above-identified patent and that said Letters Patent is hereby corrected as shown below:

Column 6,
Line 25, please delete "pane" and insert -- panel --.
Line 39, after "according to", insert -- Claim 1, wherein --.

Signed and Sealed this

Twentieth Day of December, 2005

JON W. DUDAS
*Director of the United States Patent and Trademark Office*